United States Patent
Zhong et al.

(10) Patent No.: US 11,657,143 B2
(45) Date of Patent: May 23, 2023

(54) REQUEST CONTROL DEVICE, REQUEST CONTROL METHOD, AND REQUEST CONTROL PROGRAM

(71) Applicant: NIPPON TELEGRAPH AND TELEPHONE CORPORATION, Tokyo (JP)

(72) Inventors: Yang Zhong, Musashino (JP); Tohru Sato, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 466 days.

(21) Appl. No.: 16/479,611

(22) PCT Filed: Jan. 26, 2018

(86) PCT No.: PCT/JP2018/002531
§ 371 (c)(1),
(2) Date: Jul. 22, 2019

(87) PCT Pub. No.: WO2018/143096
PCT Pub. Date: Aug. 9, 2018

(65) Prior Publication Data
US 2021/0406362 A1    Dec. 30, 2021

(30) Foreign Application Priority Data
Jan. 31, 2017 (JP) .............................. JP2017-015952

(51) Int. Cl.
*G06F 21/53* (2013.01)
*G06F 21/56* (2013.01)

(52) U.S. Cl.
CPC ............ *G06F 21/53* (2013.01); *G06F 21/566* (2013.01); *G06F 2221/034* (2013.01)

(58) Field of Classification Search
CPC ... G06F 21/53; G06F 21/566; G06F 2221/034
See application file for complete search history.

(56) References Cited

U.S. PATENT DOCUMENTS

2004/0172557 A1*  9/2004  Nakae ................. H04L 63/0263
                                                                  726/22
2005/0144513 A1   6/2005  Nakamura et al.
2017/0201543 A1*  7/2017  Terry .................. H04L 63/1425

FOREIGN PATENT DOCUMENTS

JP   2004-304752 A   10/2004
JP   2005-165599 A    6/2005
JP   2010-113380 A    5/2010

OTHER PUBLICATIONS

International Search Report and Written Opinion dated May 1, 2018 for PCT/JP2018/002531 filed on Jan. 26, 2018, 10 pages including English Translation of the International Search Report.

(Continued)

*Primary Examiner* — Jeffrey D. Popham
(74) *Attorney, Agent, or Firm* — Xsensus LLP

(57) ABSTRACT

A request control device, when receiving a request issued from a client to a Web system, causes a sandbox in which an environment of the Web system is reproduced to inspect the request. The request control device transfers the request to the Web system if an inspection result of the request in the sandbox does not indicate detection of an attack. The request control device does not transfer the request to the Web system if the inspection result of the request indicates detection of an attack.

5 Claims, 13 Drawing Sheets

(56) References Cited

OTHER PUBLICATIONS

Roesch, "Snort-Lightweight Intrusion detection for networks", Proceedings of LISA'99:13th Systems Administration Conference, Seattle, Washington, USA, Nov. 7-12, 1999, pp. 229-238.
Hofmeyr, "Intrusion Detection using Sequences of System Calls", Aug. 18, 1998, pp. 1-25.
Barnett, "WAF Virtual Patching Challenge: Securing WebGoat with ModSecurity", Breach Security Revision 1, Jan. 20, 2009, total 26 pages.
Mutz et al., "Anomalous System Call Detection", ACM Transaction on Information and System Security (TISSEC) vol. 9, Issue 1, Feb. 2006, pp. 1-31, total 31 pages.
"Cuckoo Sandbox-open source automated malware analysis", CUCKOO, Blackhat USA, Jul. 27-Aug. 1, 2013, pp. 1-13, total 13 pages.
Tcpreplay, "Tcpreplay development is now being done by AppNeta" Available online at http://tcpreplay.synfin.net, Dec. 14, 2013 (Retrieval Date: Nov. 22, 2016), total 2 pages.

\* cited by examiner

FIG.3

| (5) REQUEST (ORIGINAL) | (6) RESPONSE (ORIGINAL) |
|---|---|
| REQUEST (ORIGINAL)-1<br>GET /index.php HTTP/1.1<br>Host: example.com<br>User-Agent: Mozilla/4.0 MSIE7.0<br>... | RESPONSE (ORIGINAL)-1<br>HTTP/1.1 200 OK<br>Set-Cookie: PHPSESSID=1234abcd<br>...<br>nonce=1234 |
| REQUEST (ORIGINAL)-2<br>GET /index.php?nonce=1234 HTTP/1.1<br>Host: example.com<br>User-Agent: Mozilla/4.0 MSIE7.0<br>Cookie: PHPSESSID=1234abcd<br>... | RESPONSE (ORIGINAL)-2<br>HTTP/1.1 200 OK<br>... |
| REQUEST (ORIGINAL)-3<br>GET /index.php?file=../../etc/passwd HTTP/1.1<br>Host: example.com<br>User-Agent: Mozilla/4.0 MSIE7.0<br>Cookie: PHPSESSID=1234abcd<br>X-REQUEST-ID: xxxx | |

| (3) REQUEST (REPRODUCTION) + REQUEST ID | (4-A) RESPONSE (REPRODUCTION) + REQUEST ID |
|---|---|
| REQUEST (REPRODUCTION)-1<br>GET /index.php HTTP/1.1<br>Host: example.com<br>User-Agent: Mozilla/4.0 MSIE7.0<br>... | RESPONSE (REPRODUCTION)-1<br>HTTP/1.1 200 OK<br>Set-Cookie: PHPSESSID=fffeeee<br>...<br>nonce=5678 |
| REQUEST (REPRODUCTION)-2<br>GET /index.php?nonce=5678 HTTP/1.1<br>Host: example.com<br>User-Agent: Mozilla/4.0 MSIE7.0<br>Cookie: PHPSESSID=fffeeee<br>... | RESPONSE (REPRODUCTION)-2<br>HTTP/1.1 200 OK<br>... |
| REQUEST (REPRODUCTION)-3<br>GET /index.php?file=../../etc/passwd HTTP/1.1<br>Host: example.com<br>User-Agent: Mozilla/4.0 MSIE7.0<br>Cookie: PHPSESSID=fffeeee<br>X-REQUEST-ID: xxxx | RESPONSE (REPRODUCTION)-3<br>HTTP/1.1 200 OK<br>root:*:0:0::/root:/bin/sh<br>admin:*:1000:1000::/home/admin:/bin/bash<br>... |

REQUEST CONTROL DEVICE, REQUEST CONTROL METHOD, AND REQUEST CONTROL PROGRAM

CROSS-REFERENCE TO RELATED APPLICATIONS

The present application is based on PCT filing PCT/JP2018/002531, filed Jan. 26, 2018, which claims priority to JP 2017-015952, filed Jan. 31, 2017, the entire contents of each are incorporated herein by reference.

FIELD

The present invention relates to a request control device, a request control method, and a request control program.

BACKGROUND

Conventional attack detection and protection techniques for web applications include NIDS (a technique for detecting attack codes from feature quantities of packets, communications, and the like that flow on networks) and HIDS (a technique for detecting attacks using the order and arguments of system calls in hosts as feature quantities). A sandbox is also proposed (a technique of operating a program or a file in a protected area and determining whether the program or the file is malignant based on the behavior of the program or the file).

CITATION LIST

Non-Patent Literature

Non-patent Document 1: Roesch, Martin. "Snort-Lightweight Intrusion Detection for Networks." LISA. Vol. 99. No. 1. 1999.
Non-patent Document 2: Barnett, Ryan. "WAF Virtual Patching Challenge: Securing WebGoat with ModSecurity." Breach Security (2009)
Non-Patent Document 3: Hofmeyr, Steven A., Stephanie Forrest, and Anil Somayaji. "Intrusion Detection using Sequences of System Calls." Journal of computer security 6.3 (1998): 151-180.
Non-Patent Document 4: Mutz, Darren, et al. "Anomalous System Call Detection." ACM Transactions on Information and System Security (TISSEC) 9.1 (2006): 61-93.
Non-Patent Document 5: Guarnieri, C., et al. "Cuckoo Sandbox-open source automated malware analysis." Black Hat USA (2013)
Non-patent Document 6: Tcpreplay, [Searched on 16 Jan. 2017], Internet <URL: http://tcpreplay.synfin.net/>

SUMMARY

Technical Problem

However, NIDS has a problem that even if it is possible to detect an attack code, it is difficult to determine whether or not the attack code is executed and whether or not an attack by the attack code is valid. In addition, HIDS has a problem that it is necessary to make a change to a web server or the like so that the system call can be acquired.

Therefore, it is an object of the present invention to solve the above-mentioned problems and to accurately and efficiently detect an attack without making a change to a Web server or the like which is an actual environment.

Solution to Problem

In order to solve the above-mentioned problems, the present invention is characterized in that a control unit is provided that receives a request issued from a terminal device to a server, causes a sandbox in which an environment of the server is reproduced in order to inspect the received request, transfers the request to the server if the inspection result of the request in the sandbox does not indicate detection of an attack, and does not transfer the request to the server if the inspection result of the request indicates detection of an attack. The sandbox described herein is not intended to observe a behavior of the program or file described in the Background section, but to observe a behavior during processing on a request that flows on a network.

Advantageous Effects of Invention

According to the present invention, it is possible to accurately and efficiently detect an attack without making a change to a Web server or the like which is an actual environment.

BRIEF DESCRIPTION OF DRAWINGS

FIG. 3 is a diagram illustrating (6) response (original) with respect to (5) request (original), and (4-A) response (reproduction)+request ID with respect to (3) request (reproduction)+request ID, which are illustrated in FIG. 2.

DESCRIPTION OF EMBODIMENTS

Modes for carrying out the present invention (embodiments) will be described below from first to fourth embodiments with reference to the drawings. The present invention is not limited to each embodiment. In addition, configurations described in the embodiments can be appropriately combined within a range in which no inconsistency occurs.

First Embodiment (Overall Configuration and Outline)

Figure 1:
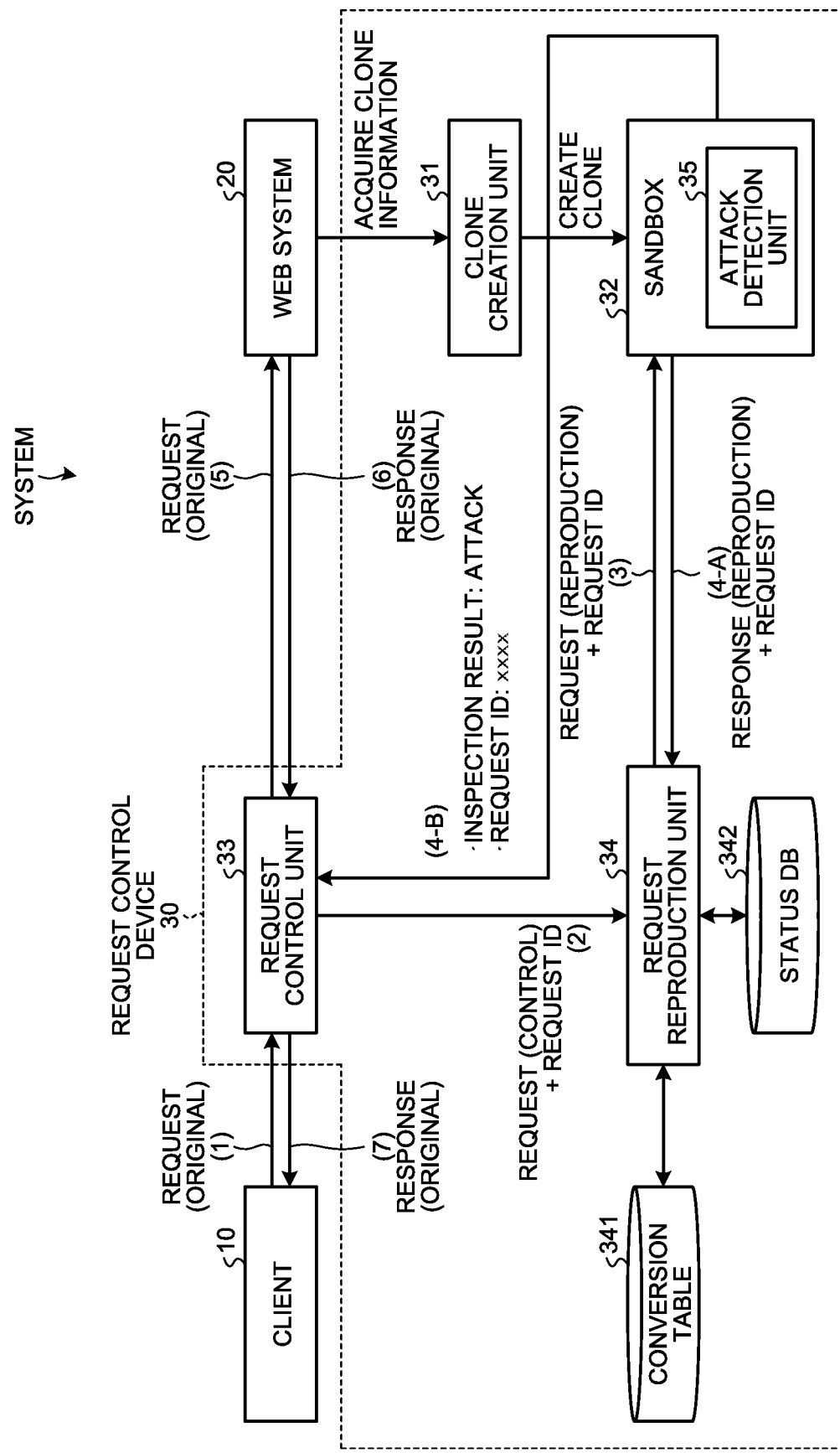
FIG. 1 is a diagram illustrating a configuration example of a system according to a first embodiment.

First, an overall configuration and outline of a system of a first embodiment will be described. As illustrated in FIG. 1, the system includes a client 10, a Web system 20, and a request control device 30.

The client 10 is a computer capable of communicating with the Web system 20 via networks, and, for example, transmits HTTP requests (requests) to the Web system 20 and receives HTTP responses (responses) from the Web system 20.

The Web system 20 is a system that is an attack detection target. The Web system 20 executes various kinds of processing in response to a request from the client 10, and returns a response to the client 10. The Web system 20 is realized by, for example, a Web server, an application server, a database (DB) server, or the like.

The request control device 30 is installed between the client 10 and the Web system 20, and receives a request issued from the client 10 to the Web system 20. The request control device 30 then inspects the received request by a sandbox 32 in which an environment of the web system 20 is reproduced, and transfers the request to the web system 20 if the inspection result of the request in the sandbox 32 does not indicate detection of an attack. On the other hand, if the inspection result of the request in the sandbox 32 indicates detection of an attack, the request control device 30 does not transfer the request to the Web system 20.

In this manner, the request control device 30 interrupts a request issued from the client 10 to the Web system 20, and inspects whether or not the request indicates an attack by the sandbox 32 in which the environment of the Web system 20 is reproduced. As a result, the system can accurately and efficiently detect an attack without making a change to the Web system 20, which is an actual environment.

(Configuration of Request Control Device)

Next, a configuration of the request control device 30 will be described with reference to FIG. 1. The request control device 30 includes a clone creation unit 31, a request control unit 33, a request reproduction unit 34, a conversion table 341, and status DB 342. The sandbox 32 is installed after the clone creation unit 31 creates the sandbox 32.

The clone creation unit 31 acquires information (clone information) for creating a clone of the Web system 20 from the Web system 20 that is an attack detection target, and creates a clone (the sandbox 32) of the Web system 20.

For example, when the Web system 20 is implemented as a virtual machine, the clone creation unit 31 can create a clone of the Web system 20 by utilizing functions of the virtual machine. When the Web system 20 is implemented as a physical machine, the clone creation unit 31 can temporarily convert the physical machine, on which the Web system 20 is implemented, into a virtual machine by utilizing a technique, such as P2V (Physical to Virtual), and can create a clone of the Web system 20 by utilizing functions of the virtual machine. Although the sandbox 32 is created inside the request control device 30 in FIG. 1, the sandbox 32 may be created outside the request control device 30.

The sandbox 32 is a device in which an environment (applications, data, etc.) of the Web system 20 that is an attack detection target is reproduced. The sandbox 32 includes an attack detection unit 35 for inspecting whether or not an input request is an attack. For example, when the attack detection unit 35 receives input of a request from the request reproduction unit 34 ((3) request (reproduction)+ request ID), the attack detection unit 35 inspects the request using information in the sandbox 32. Then, the attack detection unit 35 outputs an inspection result of the request and the request ID in association with each other to the request control unit 33 ((4-B) inspection result, request ID).

When the request control unit 33 receives a request issued from the client 10 to the web system 20, the request control unit 33 causes the sandbox 32 to inspect the received request. If an inspection result of the request in the sandbox 32 does not indicate detection of an attack, the request control unit 33 transfers the request to the Web system 20. On the other hand, if the inspection result of the request indicates detection of an attack, the request control device 30 does not transfer the request to the Web system 20.

For example, when receiving a request ((1) request (original)) from the client 10, the request control unit 33 generates and assigns a request ID of the request (original). Then, the request control unit 33 transfers the request to which the request ID is assigned to the request reproduction unit 34 ((2) request (control)+request ID).

Incidentally, the request control unit 33 holds the request with the request ID until receiving the inspection result of the request with the request ID from the sandbox 32. Then, the request control unit 33 receives the inspection result of the request with the request ID from the sandbox 32 ((4-B) inspection result, request ID), and transfers the request to the web system 20 if the inspection result of the request does not indicate detection of an attack ((5) request (original)). On the other hand, if the inspection result of the request with the request ID indicates detection of an attack, the request control unit 33 does not transfer the request to the Web system 20.

For example, if the inspection result indicates detection of an attack, the request control unit 33 discards the request or resets the communication. Meanwhile, if the inspection result is not returned from the sandbox 32 for a predetermined period of time (i.e., if the inspection result is timed out), the request control unit 33 may transfer the request to the Web system 20 or may discard the request. Whether to transfer or discard a timed-out request is set in advance by, for example, a system administrator or the like. Note that a signal for maintaining the session may be generated and transmitted to the client so that the session of the response to the request is not disconnected until a predetermined time.

In addition, when receiving a response of the request from the web system 20, the request control unit 33 returns responses ((6) response (original) and (7) response (original)) to the client 10 that has transmitted the request.

In this manner, the request control unit 33 interrupts a request and a response that are exchanged with the Web system 20, and causes the sandbox 32 in which the environment of the Web system 20 is reproduced to inspect the request. Then, the request control unit 33 does not transfer the request to the Web system 20 if the inspection result of the request is an attack, and transfers the request to the Web system 20 if the inspection result is not an attack.

The request ID assigned to the request by the request control unit 33 uses, for example, a value capable of expressing uniqueness of the request, such as a source IP address of the request, a destination IP address, a source port number, a destination port number, a time, a hash value of a byte string of the request, and the like.

For example, if the source IP address, the destination IP address, the source port number, the destination port number, and the time of the request and the hash value of the byte string of the request are represented by (1.1.1.1, 2.2.2.2, 50001, 80, 2016/00/0000:00:00.000581 fc5e8bc2861213adeacb07b851092), the request control unit 33 assigns a request ID of 1 to the request.

If the source IP address, the destination IP address, the source port number, the destination port number, and the time of the request and the hash value of the byte string of the request are represented by (3.3.3.3, 2.2.2.2, 50002, 80, 2016/00/0000:00:01.000 bcd899f4235fd90793545bba7fce19d1), the request control unit 33 assigns a request ID of 2 to the request.

When assigning the request ID to the request, the request control unit 33 performs assignment so that operation of an application used in the Web system 20 or the sandbox 32 is not affected. For example, the request control unit 33 may add the request ID to a request header of the request, or may add a dedicated parameter.

The request reproduction unit 34 partially changes the content of the input request so that the input request can be appropriately processed by the application of the sandbox 32 or the like, and outputs the request to the sandbox 32. That is, the request reproduction unit 34 changes the request input to the Web system 20 to a request that can be processed by the sandbox 32.

This is because, for example, a session ID used for identifying a user in a request or the like needs to be issued by an application that performs processing in the Web system 20 or the like, and if a request transmitted from the client 10 to the Web system 20 is retransmitted without any change to the sandbox 32, the request may fail to be correctly processed in the application of the sandbox 32.

Therefore, the request reproduction unit 34 converts the request so that the request can be appropriately processed by the application of the sandbox 32 or the like in accordance with, for example, a conversion rule (conversion information) set in the conversion table 341. The conversion rule indicates, for example, for each variable included in the request, which value the value of the variable is to be converted to. A value to be obtained by the conversion is set to a value of a variable that can be processed by the application in the sandbox 32.

For example, this conversion rule is set with a rule that relates to conversion of a nonce which is generally used as a function of checking whether or not operations are being performed from the correct client 10 in order to convert session IDs included in a request or to cope with CSRF (Cross-Site Request Forgeries).

For example, it is assumed that an application used in the Web system 20 uses a session ID. In this case, the request reproduction unit 34 rewrites the session ID included in the request output from the request control unit 33 to the session ID that has been issued in the past by the sandbox 32. For example, the request reproduction unit 34 rewrites the session ID included in the request output from the request control unit 33 to the session ID (PHPSESSID=ffffeeee) that has been issued in the past by the sandbox 32, as described below.

PHPSESSID=1234*abcd*→PHPSESSID=*ffffeeee*

When the nonce is used, it is difficult to use the nonce issued from the web system 20 without any change for the sandbox 32. Therefore, when there is a nonce that has been acquired in the past from the sandbox 32, the request reproduction unit 34 uses the nonce. For example, the request reproduction unit 34 rewrites a value of the nonce included in the request with a nonce value (nonce=5678) that has been acquired in the past from the sandbox 32, as described below.

POST/post.php?nonce=1234→POST/post.php-?nonce=5678

The above-described conversion rule is set in the conversion table 341, and values in the status DB 342 (to be described later) are used as values of variables that are used at the time of conversion.

For example, when the request reproduction unit 34 receives input of a request from the request control unit 33 ((2) request (control)+request ID), the request reproduction unit 34 refers to the conversion table 341 and the status DB 342, partially modifies the content of the request, and outputs the modified content to the sandbox 32 ((3) request (reproduction)+request ID). Then, the request reproduction unit 34 receives a response to the request from the sandbox 32 ((4-A) response (reproduction)+request ID). Thereafter, the request reproduction unit 34 accumulates values of variables included in the response received from the sandbox 32 in the status DB 342.

Figure 2:
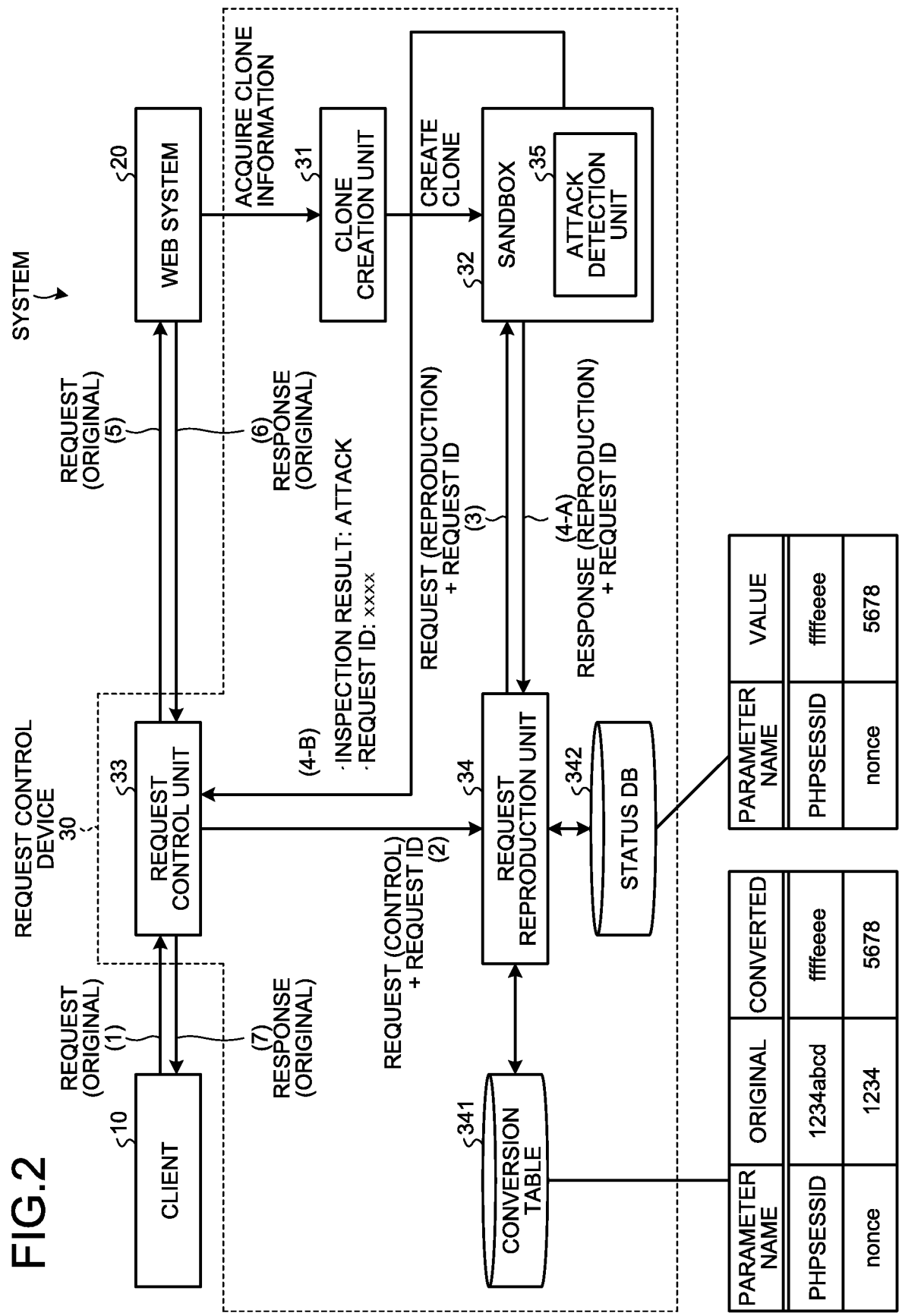
FIG. 2 is a diagram for explaining an operation example of a request control device of FIG. 1.

The conversion table 341 stores a conversion rule indicating which variable value included in the request is to be converted to which value by the request reproduction unit 34. For example, as illustrated in FIG. 2, the conversion rule is information indicating an original value of a variable and a value to which the value of the variable is to be converted, for each variable.

The status DB 342 is information indicating a value to which the value of a variable is to be converted, for each variable name as targets of conversion in the conversion rule. The status DB 342 is created, for example, based on values of variables included in responses output from the sandbox 32. For example, when the request reproducing unit 34 receives a response from the sandbox 32, a value of a variable included in the response is added to the status DB 342.

The conversion table 341 and the status DB 342 are stored in a storage unit (not illustrated) of the request control device 30. The conversion table 341 and the status DB 342 may be stored outside the request control device 30.

(Operation Example of Request Control Device)

Next, an operation example of the request control device 30 will be described with reference to FIGS. 2 and 3. FIG. 3 is a diagram illustrating (6) response (original) with respect to (5) request (original), and (4-A) response (reproduction)+request ID with respect to (3) request (reproduction)+request ID, which are illustrated in FIG. 2.

For example, as illustrated in FIG. 3, the web system 20 returns a response in which PHPSESSID=1234abcd and nonce=1234 are set as indicated by a response (original)-1, in response to a request (original)-1. Thereafter, when the web system 20 receives input of a request in which PHPSESSID=1234abcd and nonce=1234 are set as indicated by a request (original)-2, the web system 20 returns a response indicated by a response (original)-2. That is, the Web system 20 performs normal processing. Meanwhile, it is assumed that the sandbox 32 returns, to a request (reproduction)-1, a response in which PHPSESSID=ffffeeee and nonce=5678 are set as indicated by a response (reproduction)-1.

In this case, when the request reproducing unit 34 receives input of the request indicated by the request (original)-2 illustrated in FIG. 3 from the request control unit 33, the request is converted to a request in which PHPSESSID=ffffeeee and nonce=5678 are set based on the previously received response (reproduction)-1 and output to the sandbox 32. As a result, the sandbox 32 executes processing based on the request, and returns a response indicated by a response (reproduction)-2 to the request reproduction unit 34.

Further, when the request reproduction unit 34 outputs a request with a request ID=xxxx (X-REQUEST-ID:xxxx) to the sandbox 32, and if an inspection result of the request provided from the sandbox 32 is "attack" (see (4-B) in FIG. 2), a request (request (original)-3) with the request ID=xxxx (X-REQUEST-ID:xxxx) held in the request control unit 33 is not transferred to the web system 20.

In this manner, the request control device 30 can detect an attack without making a change to the Web system 20 or the like which is the actual environment.

Processing Procedure

Figure 4:
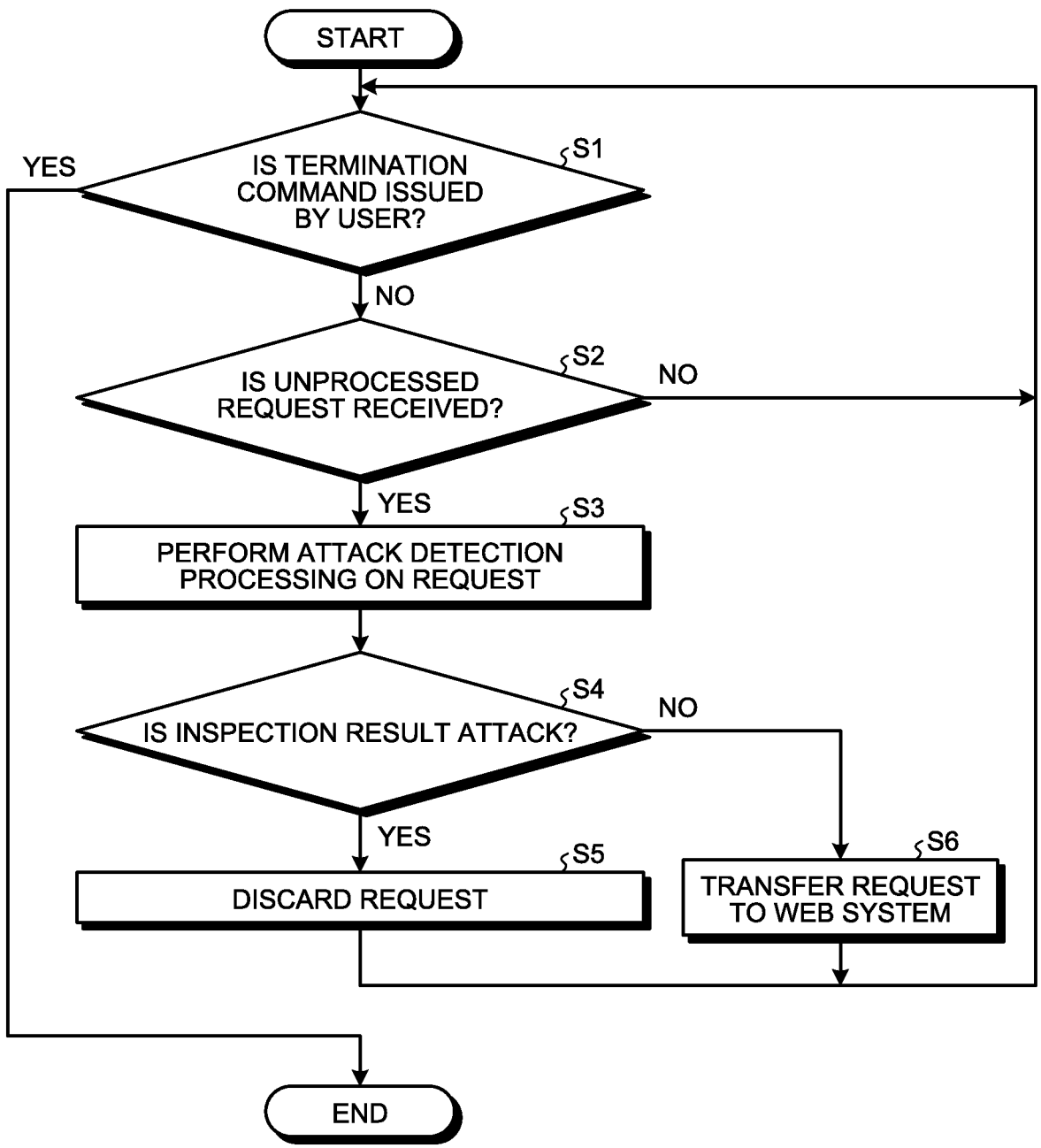
FIG. 4 is a flowchart illustrating an example of a processing procedure of the request control device of FIG. 1.

Next, an example of a processing procedure of the request control device 30 will be described with reference to FIG. 4. It is assumed that the request control device 30 has created the sandbox 32 in advance.

First, if a termination command is not issued by a user (No at S1) and an unprocessed request is received from the client 10 (Yes at S2), the request control device 30 performs attack detection processing on the request (S3). That is, the request control device 30 inspects whether or not the request is an attack in the sandbox 32. If an inspection result is an attack (Yes at S4), the request control device 30 discards the request (S5). On the other hand, if the inspection result is not an attack (No at S4), the request control device 30 transfers the request to the Web system 20 (S6). If a termination command is issued by the user (Yes at S1), the request control device 30 does not execute the processing from S3 to S6, and terminates the processing. If an unprocessed request is not received at S2 (No at S2), the request control device 30 returns to S1.

Figure 5:
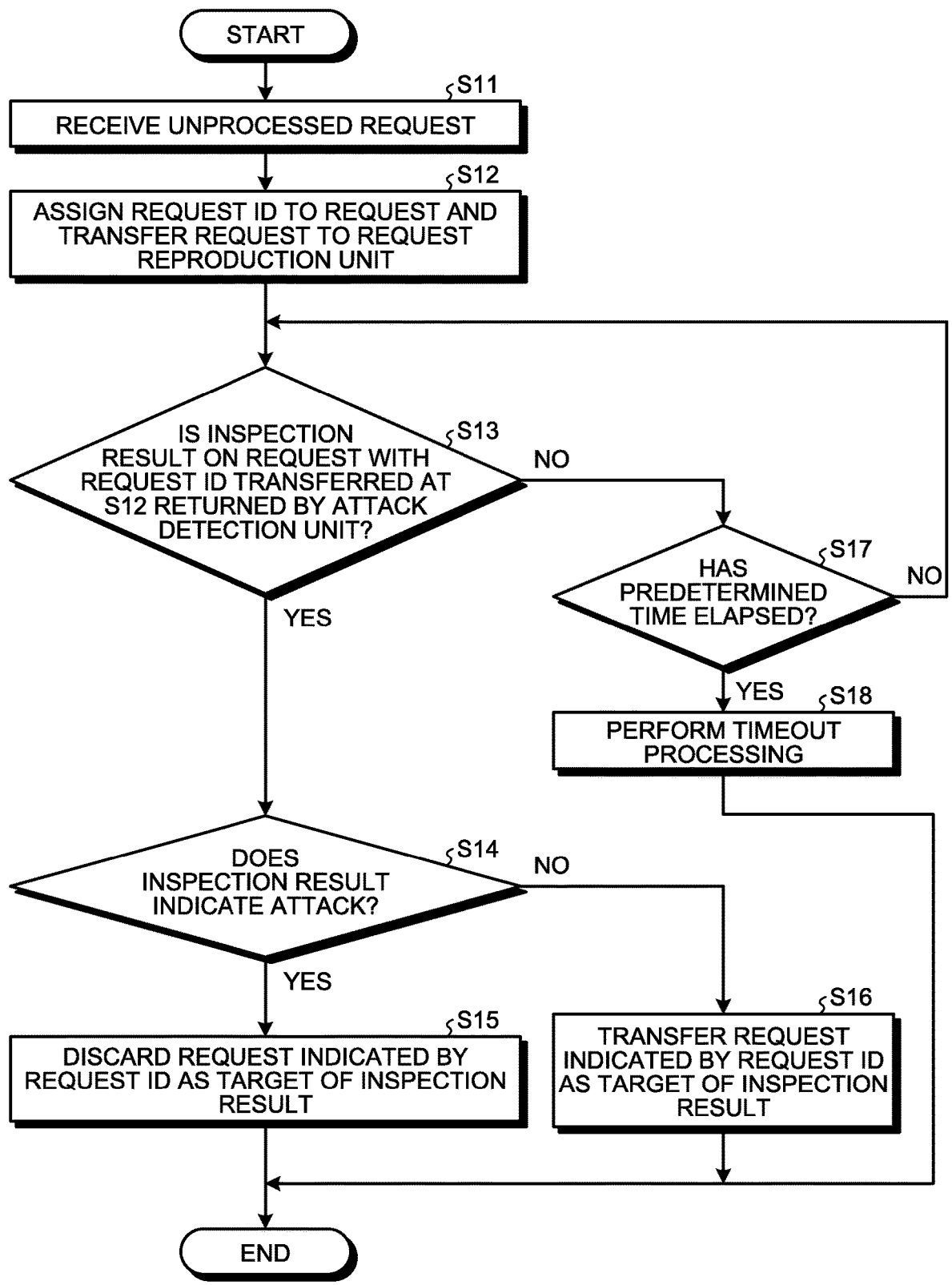
FIG. 5 is a flowchart illustrating an example of a processing procedure of a request control unit of FIG. 1.

Next, an example of a processing procedure of the request control unit 33 will be described in detail with reference to FIG. 5. If an unprocessed request is received (S11), the request control unit 33 assigns a request ID to the request and transfers the request to the request reproduction unit 34 (S12). Thereafter, the request is transferred to the sandbox 32 by the request reproduction unit 34, and is inspected by the sandbox 32.

After S12, the attack detection unit 35 returns an inspection result with respect to the request with the request ID transferred at S12 (Yes at S13), and if the inspection result indicates an attack (Yes at S14), the request control unit 33 discards the request indicated by the request ID as a target of the inspection result (S15). On the other hand, if the inspection result does not indicate an attack (No at S14), the request control unit 33 transfers the request indicated by the request ID as the target of the inspection result to the Web system 20 (S16).

If the attack detection unit 35 does not return the inspection result with respect to the request with the request ID transferred at S12 (No at S13), and if a predetermined time has elapsed (Yes at S17), the request control unit 33 performs timeout processing (S18). If the predetermined time has not yet elapsed (No at S17), the process returns to S13.

In this manner, the request control device 30 can detect an attack without making a change to the Web system 20 or the like which is the actual environment.

Second Embodiment

In some cases, the request control device 30 is not able to perform cloning of the virtual machine of the Web system 20 due to compliance and security policy of the Web system 20. In such a case, if the application used in the Web system 20 is an open source application, the sandbox 32 may be created using the application, and the request control device may detect an attack on the request using the sandbox 32.

A request control device using the sandbox 32 as described above will be described as a request control device 30a. The same components as those of the above-described embodiment are denoted by the same reference numerals, and descriptions thereof are omitted.

Figure 6:
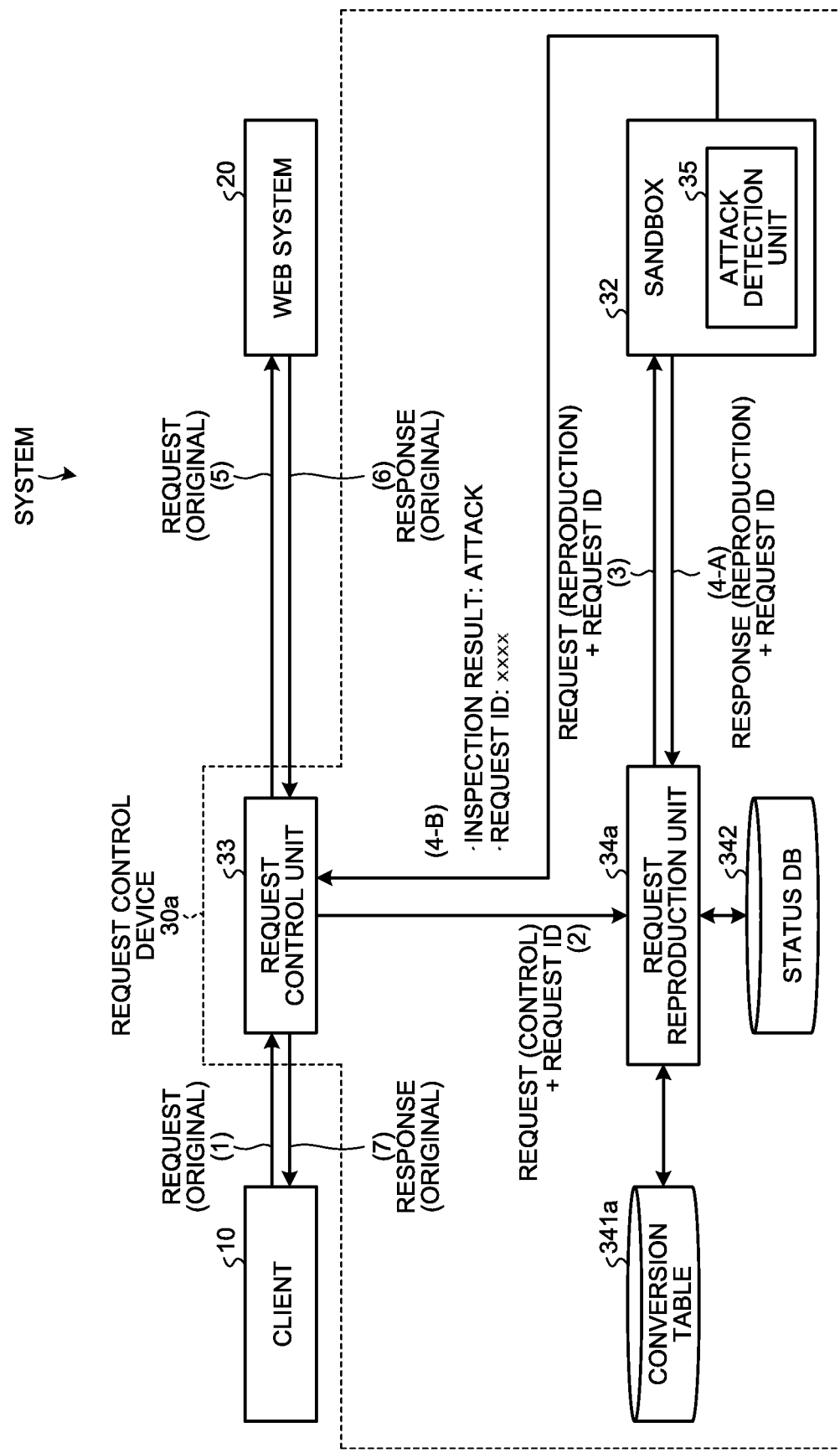
FIG. 6 is a diagram illustrating a configuration example of a system according to a second embodiment.

As illustrated in FIG. 6, the request control device 30a includes a conversion table 341a and a request reproduction unit 34a.

The conversion table 341a includes a conversion rule related to conversion of a login user (refer to a rule indicated by a reference numeral 701 in FIG. 7) and a conversion rule related to conversion of a dynamic content ID (refer to a rule indicated by a reference numeral 702 in FIG. 7) in addition to a conversion rule related to conversion of a session ID and a conversion rule related to conversion of a nonce included in a request. Then, the request reproduction unit 34a performs conversion of the login user and conversion of the dynamic content ID in the request in accordance with the conversion rules set in the conversion table 341a, and outputs the request to the sandbox 32.

For example, when the request received from the request control unit 33 includes a part relating to a login process, the request reproduction unit 34a converts the request based on the conversion rule relating to the conversion of the login user so that the request is operated normally even when the request is used for the login process of the user of the sandbox 32.

For example, the request reproduction unit 34a converts a description of "POST/login.php?user=admin&password=mypasswd" included in the request received from the client 10 into "POST/login.php?user=sandbox&password=sandbox_passwd" so that the request operates normally even when the request is used for the login process of the user of the sandbox 32.

The request reproduction unit 34a converts the request as described above, so that it is possible to normally perform the login process in the sandbox 32 even when the sandbox 32 is not a clone of the Web system 20.

Further, for example, when the request received from the request control unit 33 includes a description relating to dynamic content (e.g., an article for a blog or the like), the request reproduction unit 34a converts the request based on the conversion rule relating to conversion of the dynamic content ID so that the request is operated normally even when the request is used for a request to dynamic content of the sandbox 32.

For example, the request reproduction unit 34a converts a description of "GET/index.php?page_id=100" included in the request into "GET/index.php?page_id=1" so that the request is converted to a request for the dynamic content of the sandbox 32.

The request reproduction unit 34a converts the request as described above, so that it is possible to normally perform processing on the dynamic content in the sandbox 32 even when the sandbox 32 is not a clone of the Web system 20.

When the request includes a description relating to static content or the like, the request reproduction unit 34a does not convert the request because it is not necessary to convert the request. For example, when the request includes a request for static content, such as "GET/css/style.css" or "GET/favicon.ico", the request reproduction unit 34a does not convert the request.

(Operation Example of Request Control Device)

Figure 7:
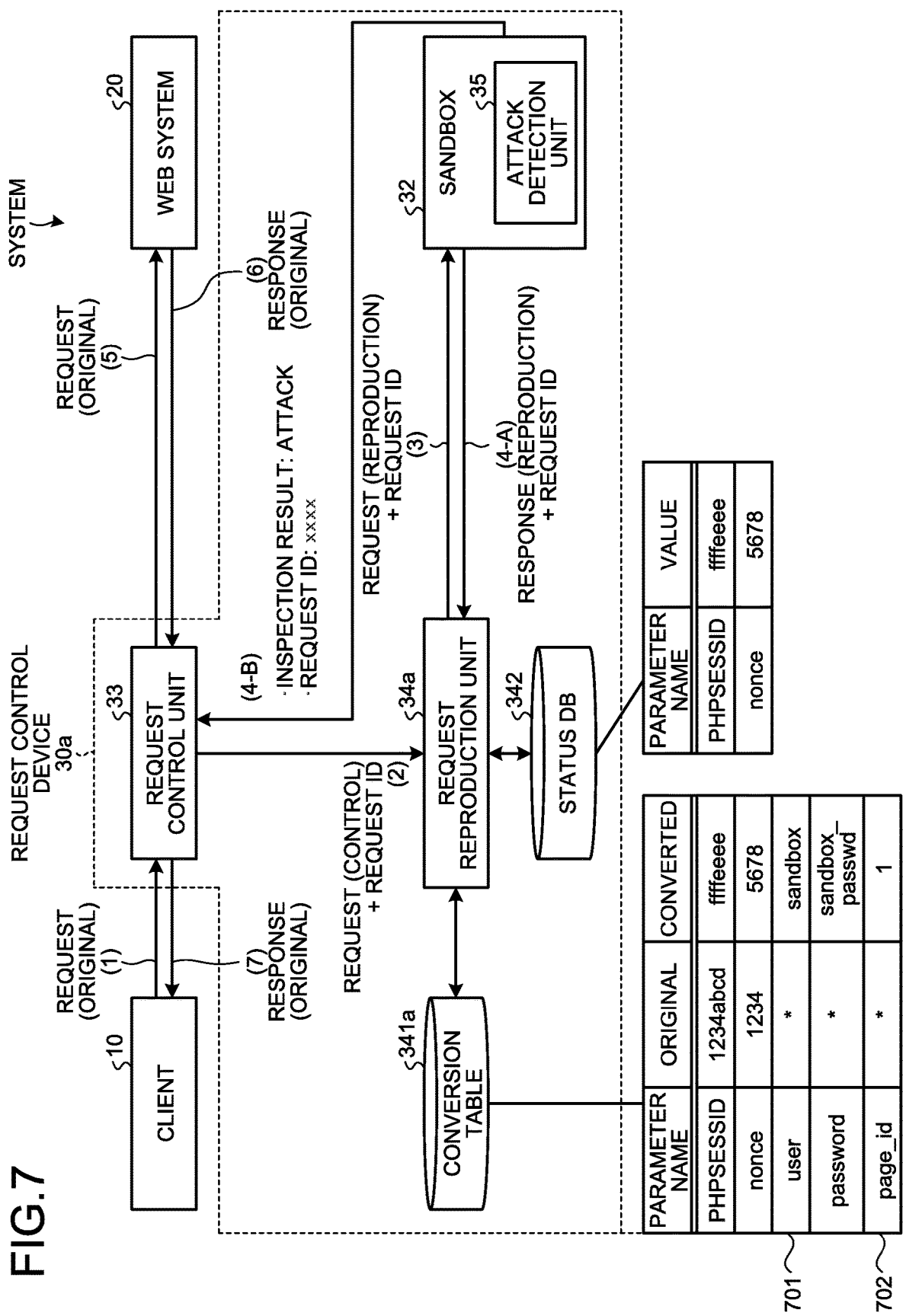
FIG. 7 is a diagram for explaining an operation example of the request control device of FIG. 6.
Figure 8:
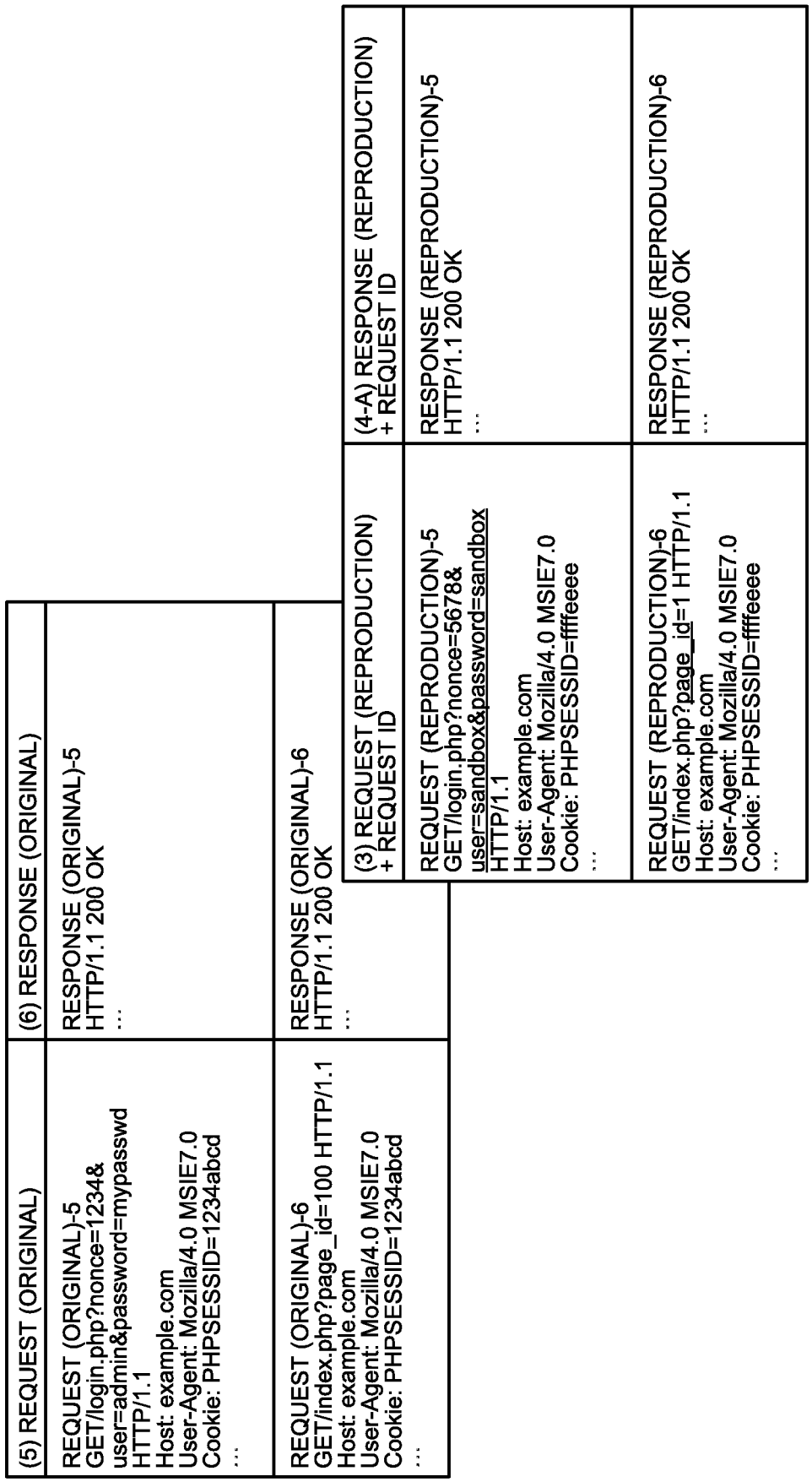
FIG. 8 is a diagram illustrating (6) response (original) with respect to (5) request (original), and (4-A) response (reproduction)+request ID with respect to (3) request (reproduction)+request ID, which are illustrated in FIG. 7.

Next, an operation example of the request control device 30a will be described with reference to FIGS. 7 and 8. FIG. 8 is a diagram illustrating (6) response (original) with respect to (5) request (original), and (4-A) response (reproduction)+request ID with respect to (3) request (reproduction)+request ID, which are illustrated in FIG. 7.

For example, as illustrated in FIG. 8, the Web system 20 returns a response indicated by a response (original)-5 in response to a request (original)-5. It is assumed that when the web system 20 receives input of a request indicated by a request (original)-6, the web system 20 returns a response indicated by a response (original)-6.

In this case, when the request reproduction unit 34a receives input of the request (original)-5 including "GET/login.php?nonce=1234&user=admin&password=mypasswd" illustrated in FIG. 8 from the request control unit 33, the request reproduction unit 34a converts values of the nonce and the user ID and password of the request. For example, the request reproduction unit 34 converts the values of the nonce and the user ID and password into "GET/login.php?nonce=5678&user=sandbox&password=sandbox" as indicated by a request (reproduction)-5.

As a result, it is possible to operate the same application as the Web system 20 in the sandbox 32 based on the request. As a result, for example, the request reproduction unit 34a can receive a response indicated by a response (reproduction)-5 from the sandbox 32.

When the request reproduction unit 34a receives input of the request (original)-6 including "GET/index.php?page_id=100" illustrated in FIG. 8 from the request control unit 33, the request reproduction unit 34a converts a value of page_id of the request. For example, the request reproduction unit 34a converts the value of page_id of the request to "GET/index.php?page_id=1" as indicated by a request (reproduction)-6.

Therefore, it is possible to normal perform processing based on the request even in the sandbox 32. As a result, for example, the request reproduction unit 34a can receive a response indicated by a response (reproduction)-6 from the sandbox 32.

Third Embodiment

A request control device may be configured not to perform inspection again in the sandbox 32 for a request of the same type as the request that has been inspected in the sandbox 32, in order to improve the processing throughput of the request. The request control device as described above will be described as a request control device 30b. The same components as those of the above-described embodiments are denoted by the same reference numerals, and descriptions thereof are omitted.

Figure 9:
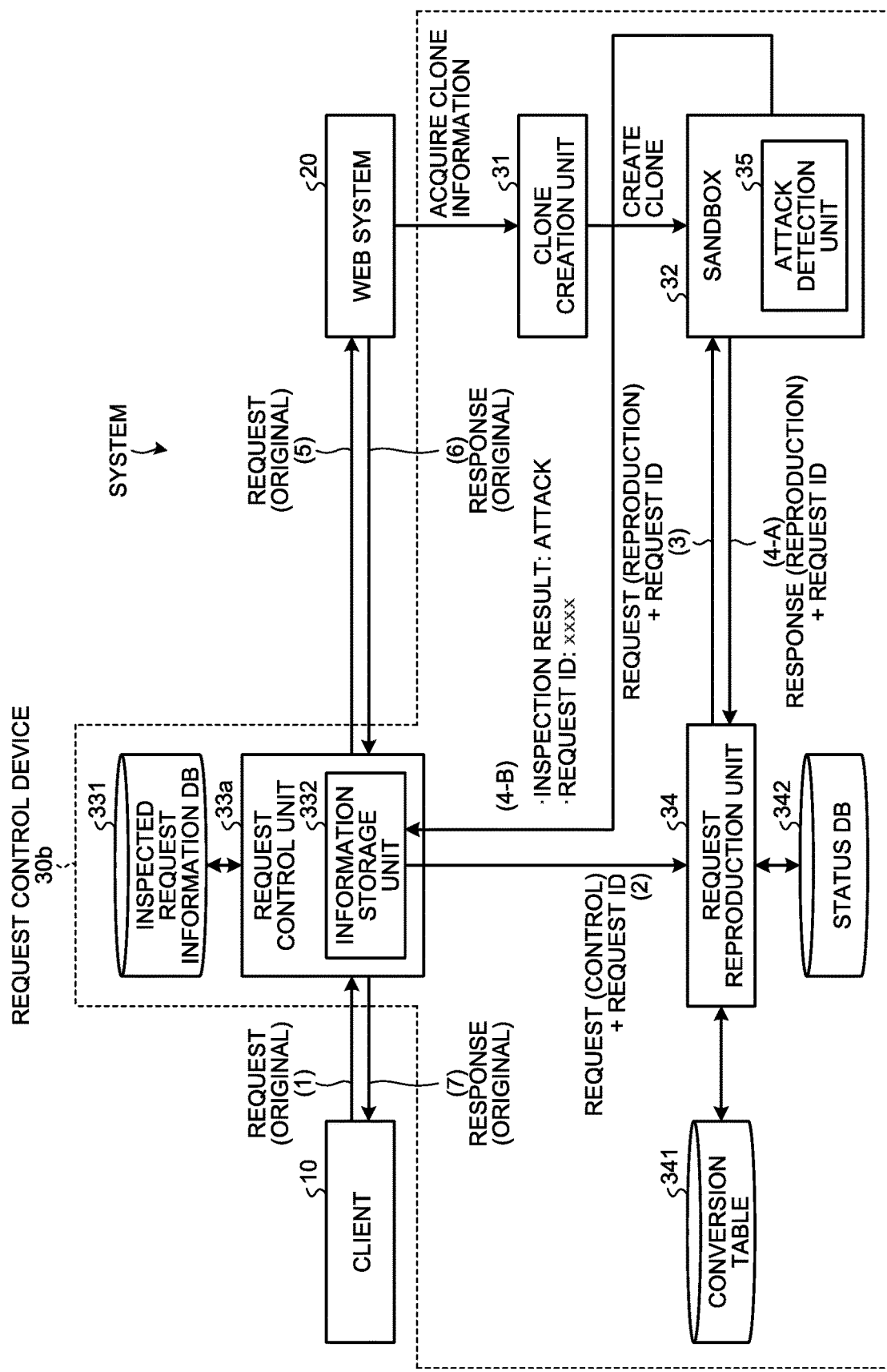
FIG. 9 is a diagram illustrating a configuration example of a system according to a third embodiment.

As illustrated in FIG. 9, the request control device 30b includes a request control unit 33a and an inspected request information DB 331.

The request control unit 33a does not output a request of the same type as the request that has been inspected in the sandbox 32 to the request reproduction unit 34. Here, an example will be described in which the request control unit 33a uses a hash value (request hash ID) of a byte string of each request in order to identify a request of the same type as the inspected request. The request control unit 33a determines that a request having the same request hash ID is the request of the same type.

For example, the request control unit 33a stores a request hash ID of a request that has been inspected in the past by the sandbox 32 and an inspection result of the request in an associated manner in the inspected request information DB 331. When receiving a request from the client 10, the request control unit 33a obtains a request hash ID of the request. Then, the request control unit 33a refers to the inspected request information DB 331, and if a request with the request hash ID has not been inspected, the request control unit 33a transfers the received request to the request reproduction unit 34. That is, the request control unit 33a causes the sandbox 32 to inspect the request.

On the other hand, the request control unit 33a refers to the inspected request information DB 331, and if a request with the request hash ID has been inspected and an inspection result with the request hash ID does not indicate detection of an attack, the request control unit 33a transfers the request to the web system 20. In addition, the request control unit 33a refers to the checked request information DB 331, and if the request with the request hash ID has been inspected and the inspection result with the request hash ID indicates detection of an attack, the request control unit 33a does not transfer the request to the web system 20.

The request control unit 33a includes an information storage unit 332. The information storage unit 332 stores the inspection result of the request that has been inspected in the past by the sandbox 32 in the inspected request information DB 331. Specifically, the information storage unit 332 obtains a request hash ID of the request that has been inspected by the sandbox 32. The request hash ID is obtained by using, for example, at least one of a hash value of a byte string of the request and an IP address, a port number, and a reception time included in the request.

Thereafter, the information storage unit 332 stores, in the inspected request information DB 331, information (inspected request information) in which the request hash ID of the request and the inspection result of the request are associated with each other with respect to the request that has been inspected by the sandbox 32.

The inspected request information DB 331 stores therein the inspected request information. The inspected request information DB 331 is stored in a storage unit (not illustrated) of the request control device 30b. The inspected request information DB 331 may be stored outside the request control device 30b.

(Operation Example of Request Control Device)

Figure 10:
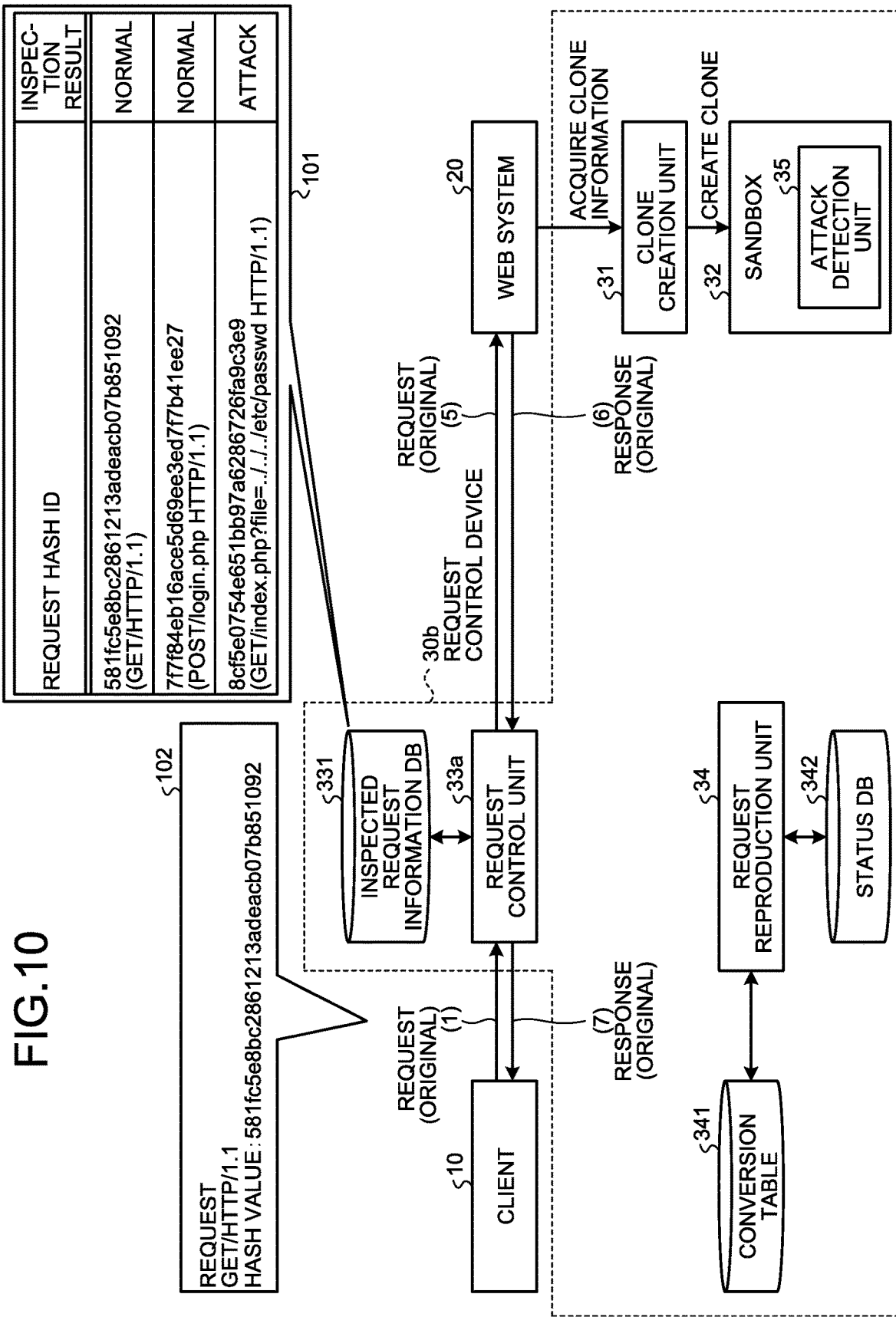
FIG. 10 is a diagram for explaining an operation example of the request control device of FIG. 9.

Next, an operation example of the request control device 30b will be described with reference to FIG. 10. In FIG. 10, it is assumed that the inspected request information DB 331 stores therein inspected request information indicated by a reference numeral 101.

For example, it is assumed that the request control unit 33a receives a request indicated by a reference numeral 102 as (1) request (original) from the client 10. In this case, a request hash ID of the request is included in the inspected request information DB 331 and an inspection result is "normal", and therefore, the request control unit 33a transfers the request to the web system 20 without any change.

Although the explanation is omitted here, if the request hash ID of the request is included in the inspected request information DB 331 but if the inspection result is "attack," the request control unit 33a discards the request or resets the communication, and does not transfer the request to the web system 20. If the request hash ID of the request is not included in the inspected request information DB 331, the request control unit 33a outputs the request to the request reproduction unit 34, and performs inspection by the sandbox 32. Then, the request control unit 33a determines whether or not to transfer the request to the Web system 20 in accordance with an inspection result of the request.

According to the request control device 30b, a request of the same type, such as a request having the same hash value of the byte string as the request that has been inspected by the sandbox 32, is not inspected again by the sandbox 32. Therefore, the request control device 30b can improve the processing throughput of the request.

Fourth Embodiment

A request control device may be configured to identify, from a past access log or communication packet (e.g., a PCAP (Packet CAPture) to the web system 20, a variable of a request that needs to be converted when transferring the request to the sandbox 32 and set the variable in the conversion table 341.

The request control device as described above will be described as a request control device 30c. The same components as those of the above-described embodiments are denoted by the same reference numerals, and descriptions thereof are omitted.

Figure 11:
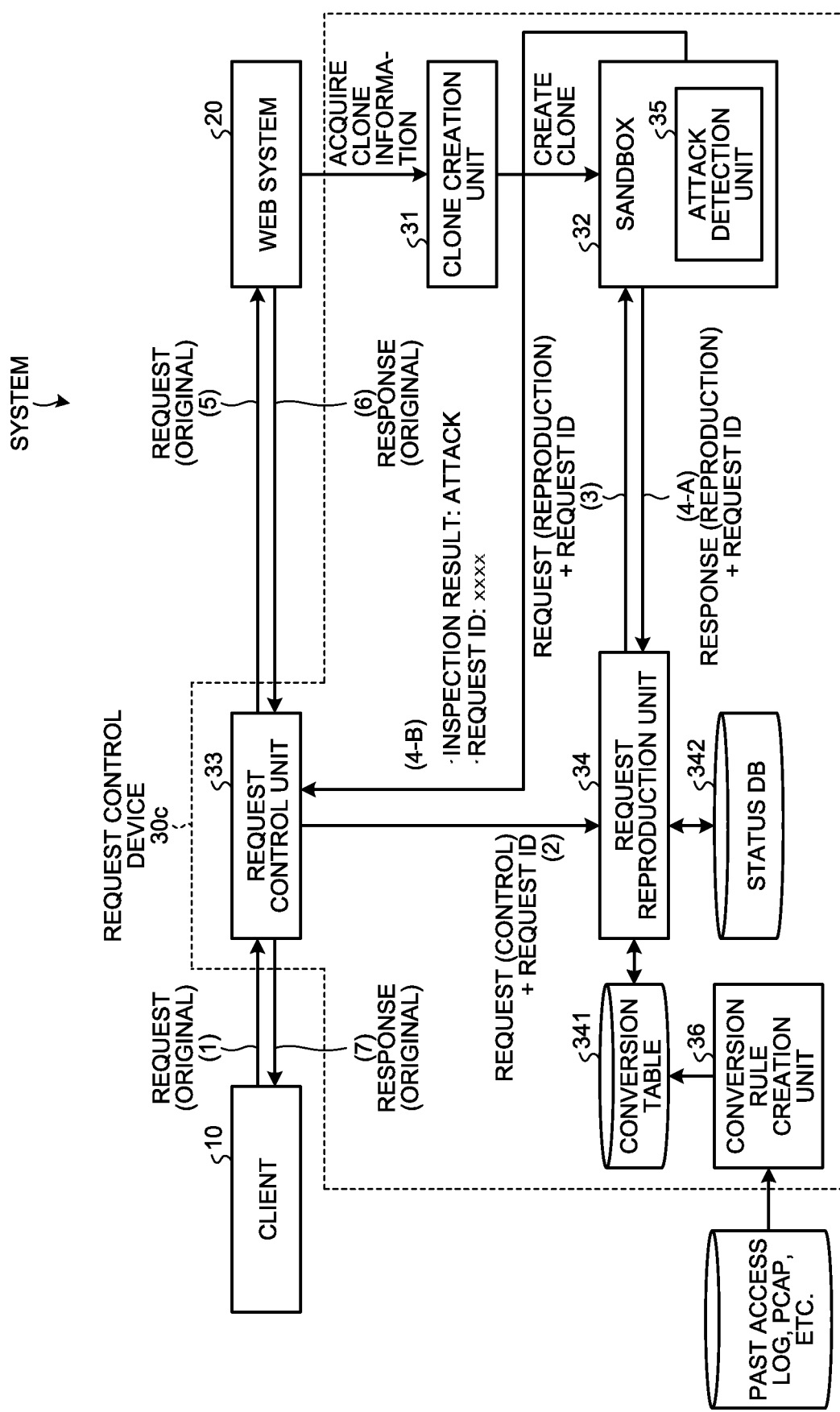
FIG. 11 is a diagram illustrating a configuration example of a system according to a fourth embodiment.

As illustrated in FIG. 11, the request control device 30c further includes a conversion rule creation unit 36 (conversion information setting unit). The conversion rule creation unit 36 extracts variables included in requests from a past access log or a PCAP to the web system 20. Then, the conversion rule creation unit 36 identifies, from among the extracted variables, a variable whose value frequently changes at every access or communication to the Web system 20.

For example, the conversion rule creation unit 36 identifies, as a variable to be converted in the request, a variable for which the degree of value change at every access or communication to the Web system 20 in the past is equal to or higher than a predetermined threshold. Then, the conversion rule creation unit 36 sets the identified variable in the conversion rule in the conversion table 341.

An example of a procedure for creating a conversion rule by the conversion rule creation unit 36 will be described. For example, the conversion rule creation unit 36 extracts a variable portion of the request from a request URL, a request header, a request data portion, and the like in the past access log to the Web system 20.

Subsequently, the conversion rule creation unit 36 obtains a degree of dispersion V defined by Equation (1) below from a set X of variable values for each of the extracted variables. In Equation (1), unig(X) is a function for extracting a unique element from the set X.

[Equation 1]

$$V = \frac{|\text{uniq}(X)|}{|X|} \quad (1)$$

Here, when V obtained by Equation (1) is equal to or larger than a predetermined threshold T, the conversion rule creation unit 36 determines that the variable is a variable, such as a session ID or a nonce, for which the degree of value change at every access or communication to the Web system 20 is high. Then, the conversion rule creation unit 36 identifies the variable as a variable that needs to be converted. On the other hand, when V is smaller than the threshold T, the conversion rule creation unit 36 determines that the variable is a variable that need not be converted.

Figure 12:
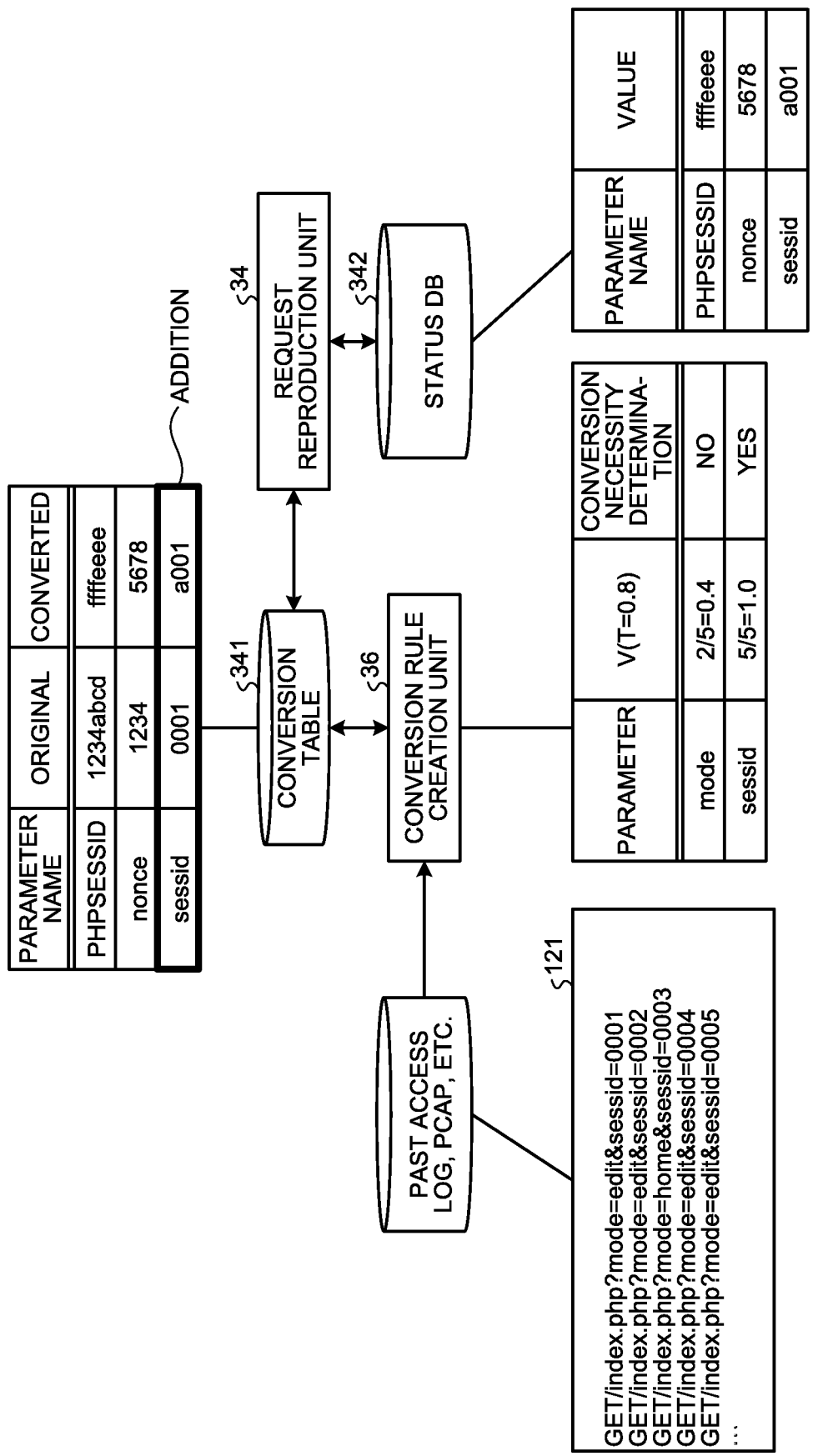
FIG. 12 is a diagram for explaining an operation example of a conversion rule creation unit of FIG. 11.

An operation example of the conversion rule creation unit 36 will be described with reference to FIG. 12. An example will be described in which the conversion rule creation unit 36 sets the threshold T to 0.8 for V in Equation (1) above, by using a past access log, a PCAP, and the like indicated by a reference numeral 121.

For example, it is assumed that the conversion rule creation unit 36 extracts two variables of mode and sessid from the past access log, the PCAP, and the like indicated by the reference numeral 121, calculates V of each of the variables by Equation (1) above, and obtains 0.4 as a value of V of mode and 1.0 as a value of V of sessid. In this case, the conversion rule creation unit 36 determines that the conversion is not needed for mode (No) because the value of V of mode is smaller than the threshold T (0.8), and determines that the conversion is needed for sessid (Yes) because the value of V of sessid is larger than the threshold value T (0.8). Then, the conversion rule creation unit 36 adds the conversion rule related to sessid to the conversion table 341. For example, as for a value of sessid, the conversion rule creation unit 36 reads a value of "a001" of sessid registered in the status DB 342, and adds a conversion rule for converting a value of sessid (e.g., "0001") in a request into "a001" to the conversion table 341.

Based on the conversion table 341 as described above, the request reproduction unit 34 converts a value of sessid into "a001" for a request in which a value of sessid is set to "0001", and outputs the request to the sandbox 32.

As described above, the request control device 30c can automatically add the conversion rule to the conversion table 341 by using the past access log, the PCAP, and the like, so that it is possible to reduce time and effort needed for a user to add the conversion rule to the conversion table 341.

Programming

The request control devices 30, 30 a, 30b, and 30c described in the above embodiments may be implemented by installing a program for realizing the functions of these devices in a desired information processing apparatus (computer). For example, it is possible to cause the information processing apparatus to function as the request control devices 30, 30 a, 30b, and 30c by causing the information processing apparatus to execute the above-described program that is provided as package software or online software. The information processing apparatus described herein includes a desktop or notebook personal computer. In addition, the information processing apparatus includes a smartphone, a mobile communication terminal, such as a cellular phone or a PHS (Personal Handyphone System), a PDA (Personal Digital Assistants), and the like. The request control devices 30, 30a, 30b, and 30c may be implemented on a cloud server.

Figure 13:
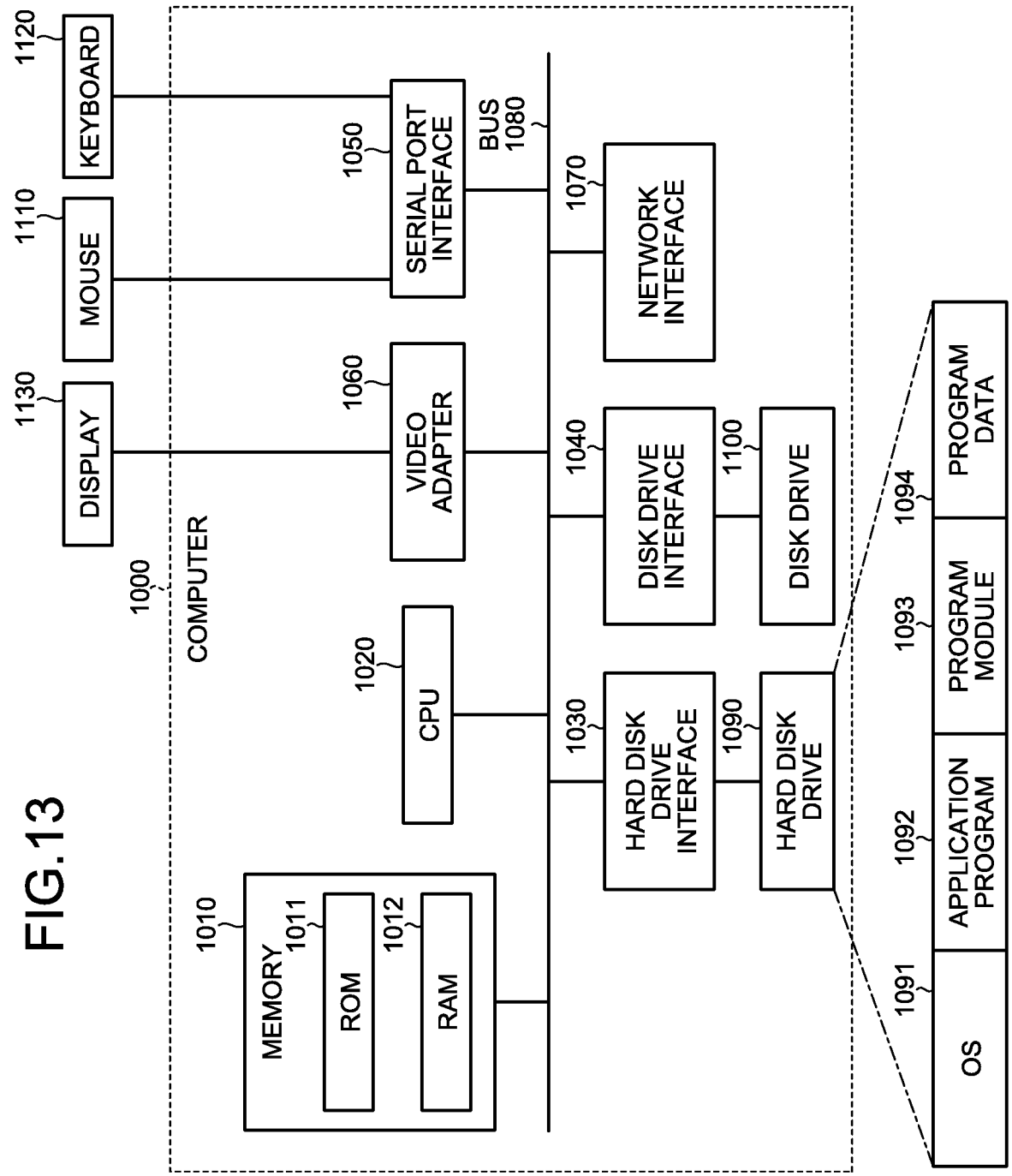
FIG. 13 is a diagram illustrating a computer that executes a request control program.

An example of a computer that executes the above-described program (request control program) will be described. FIG. 13 is a diagram illustrating a computer that executes a request control program. As illustrated in FIG. 13, a computer 1000 includes, for example, a memory 1010, a CPU (Central Processing Unit) 1020, a hard disk drive interface 1030, a disk drive interface 1040, a serial port interface 1050, a video adapter 1060, and a network interface 1070. These components are connected to one another by a bus 1080.

The memory 1010 includes a ROM (Read Only Memory) 1011 and a RAM (Random Access Memory) 1012. The ROM 1011 stores therein, for example, a boot program, such as BIOS (Basic Input Output System). The hard disk drive interface 1030 is connected to a hard disk drive 1090. The disk drive interface 1040 is connected to a disk drive 1100.

A removable storage medium, such as a magnetic disk or an optical disk, is inserted into the disk drive 1100. For example, a mouse 1110 and a keyboard 1120 are connected to the serial port interface 1050. A display 1130, for example, is connected to the video adapter 1060.

As illustrated in FIG. 13, the hard disk drive 1090 stores therein, for example, an OS 1091, an application program 1092, a program module 1093, and program data 1094. Various kinds of data and information described in the above embodiments are stored in, for example, the hard disk drive 1090 or the memory 1010.

Then, the CPU 1020 loads the program module 1093 and the program data 1094 stored in the hard disk drive 1090 onto the RAM 1012 and executes the above-described procedures if needed.

The program module 1093 and the program data 1094 related to the request control program need not always be stored in the hard disk drive 1090, and may be stored in a removable storage medium and read by the CPU 1020 via the disk drive 1100 or the like, for example. Alternatively, the program module 1093 and the program data 1094 related to the request control program may be stored in another computer connected via a network, such as a LAN (Local Area Network) or a WAN (Wide Area Network), and may be read by the CPU 1020 via the network interface 1070.

REFERENCE SIGNS LIST

10 CLIENT
20 WEB SYSTEM
30, 30a, 30b, 30c REQUEST CONTROL DEVICE
31 CLONE CREATION UNIT
32 SANDBOX
33, 33a REQUEST CONTROL UNIT
34,34a REQUEST REPRODUCTION UNIT
35 ATTACK DETECTION UNIT
36 CONVERSION RULE CREATION UNIT
331 INSPECTED REQUEST INFORMATION DB
332 INFORMATION STORAGE UNIT
341,341a CONVERSION TABLE
342 STATUS DB

The invention claimed is:

1. A request control device comprising:
a memory; and
a processor coupled to the memory and programmed to execute a process comprising:
receiving a request issued from a terminal device to a server, causing a sandbox in which an environment of the server is reproduced to execute the received request, determining whether an execution result of the request in the sandbox indicates detection of an attack, transferring the request to the server in response to a determination that the execution result of the request in the sandbox does not indicate detection of an attack, and not transferring the request to the server in response to a determination that the execution result of the request indicates detection of an attack;
storing in a memory, for each of variables included in the request, conversion information indicating a value of the variable, the value of the variable being processible in an application in the sandbox;
receiving a request issued from the terminal device and, converting a variable in the request into the value of the variable that is processible in the application in the sandbox, and transferring the request to the sandbox; and
extracting variables included in the request from a past access log or a communication packet to the server, obtaining a degree of dispersion for each of the extracted variables, and determining, from the degree of dispersion, whether the extracted variables have a degree of value change at every access or communication to the server which is equal to or higher than a predetermined nonzero threshold such that a variable determined to have the degree of value change equal to or higher than the threshold is identified as a variable to be converted in the request and is converted, and a variable determined to have the degree of value change lower than the threshold is not converted.

2. The request control device according to claim 1, wherein a variable to be converted among the variables included in the request is at least one of a session ID, a nonce, a user ID, a password, and a content ID of dynamic content that are included in the request.

3. The request control device according to claim 1, wherein the processor is further programmed to execute:
obtaining identification information on the request by using at least one of an IP address of the request, a port number, a reception time, and a hash value of the request, and storing, in a memory, inspected request information in which the identification information on the request and an execution result of the request in the sandbox are associated with each other, and
when receiving a request from the terminal device, obtaining the identification information on the received request from the inspected request information, causing the sandbox to execute the received request if a request corresponding to the identification information has not been inspected, and transferring the received request to the server if a request corresponding to the identification information has been inspected and an inspection result of the request does not indicate detection of an attack in the inspected request information.

4. A request control method implemented by a request control device that controls a request issued from a terminal device to a server, the method comprising:
receiving the request issued from the terminal device to the server;
causing a sandbox in which an environment of the server is reproduced to execute the received request;
determining whether an execution result of the request in the sandbox indicates detection of an attack;
transferring the request to the server in response to a determination that the execution result of the request in the sandbox does not indicate detection of an attack;
preventing transfer of the request to the server in response to a determination that the execution result of the request indicates detection of an attack;
storing in a memory, for each of variables included in the request, conversion information indicating a value of the variable, the value of the variable being processible in an application in the sandbox;
receiving a request issued from the terminal device and, converting a variable in the request into the value of the variable that is processible in the application in the sandbox, and transferring the request to the sandbox; and
extracting variables included in the request from a past access log or a communication packet to the server, obtaining a degree of dispersion for each of the extracted variables, and determining, from the degree of dispersion, whether the extracted variables have a degree of value change at every access or communication to the server which is equal to or higher than a predetermined nonzero threshold such that a variable determined to have the degree of value change equal to or higher than the threshold is identified as a variable to be converted in the request and is converted, and a variable determined to have the degree of value change lower than the threshold is not converted.

5. A non-transitory computer readable storage medium having stored therein a request control program that causes a computer to execute a process comprising:

receiving a request issued from a terminal device to a server;

causing a sandbox in which an environment of the server is reproduced to execute the received request;

determining whether an execution result of the request in the sandbox indicates detection of an attack;

transferring the request to the server in response to a determination that the execution result of the request does not indicate detection of an attack;

preventing transfer of the request to the server in response to a determination that the execution result of the request indicates detection of an attack;

storing in a memory, for each of variables included in the request, conversion information indicating a value of the variable, the value of the variable being processible in an application in the sandbox;

receiving a request issued from the terminal device and, converting a variable in the request into the value of the variable that is processible in the application in the sandbox, and transferring the request to the sandbox; and extracting variables included in the request from a past access log or a communication packet to the server, obtaining a degree of dispersion for each of the extracted variables, and determining, from the degree of dispersion, whether the extracted variables have a degree of value change at every access or communication to the server which is equal to or higher than a predetermined nonzero threshold such that a variable determined to have the degree of value change equal to or higher than the threshold is identified as a variable to be converted in the request and is converted, and a variable determined to have the degree of value change lower than the threshold is not converted.

* * * * *